United States Patent [19]

Hodge

[11] Patent Number: 5,154,517
[45] Date of Patent: Oct. 13, 1992

[54] ANTI-FRICTION BEARING WITH INTEGRAL OIL FEED TUBE

[75] Inventor: Bobby L. Hodge, Charlotte, N.C.

[73] Assignee: INA Bearing Company, Inc., Fort Mill, S.C.

[21] Appl. No.: 686,484

[22] Filed: Apr. 17, 1991

[51] Int. Cl.⁵ ............... F16C 33/46; F16C 33/58
[52] U.S. Cl. ................... 384/470; 384/475; 384/569; 384/515
[58] Field of Search ........... 384/470, 475, 569, 515, 384/513, 572

[56] References Cited

U.S. PATENT DOCUMENTS 1.676.894  7/1928  Frank .
1.704.362  3/1929  Johnson .
1.737.465  11/1929  Lindsey .
4.764.086  8/1988  Jesinger .

Primary Examiner—Lenard A. Footland
Attorney, Agent, or Firm—Wigman & Cohen

[57] ABSTRACT

An anti-friction bearing assembly having an integrally formed oil feed nozzle especially for use in automotive manual transmissions is disclosed. The oil feed nozzle may be formed as part of the outer race of a shell bearing or as part of the cage of a shell bearing. The nozzle directs oil from a reservoir into the axial bore of a shaft for supplying lubricant to cross bores in the shaft. Vanes may be provided on the nozzle formed integrally with the cage so that when the cage rotates the vanes pump the oil through the nozzle and the shaft bore.

15 Claims, 1 Drawing Sheet

ANTI-FRICTION BEARING WITH INTEGRAL OIL FEED TUBE

FIELD OF THE INVENTION

The present invention relates to anti-friction bearings and more particularly to an anti-friction bearing having an oil feed tube or nozzle integrally formed in one of the bearing components.

DESCRIPTION OF THE PRIOR ART

It is well known in the art of automotive manual transmissions to use an auxiliary component, such as an oil feed nozzle, to direct oil flow through a bore or passageway formed along the axis of a shaft for supplying oil to one or more points along the shaft via radial oil feed holes communicating with the bore. In the current design of a typical automotive manual transmission, for example, the oil feed nozzle is a separate piece mounted adjacent the shaft bearing which rotatably supports one end of a shaft. This conventional oil feed nozzle comprises a plate or disc portion and a tubular nozzle portion which extends from a central opening in the disc portion. The disc portion is fixedly clamped between the transmission housing and the annular end face of the outer bearing race and the tubular nozzle extends into an axial bore in the shaft to direct oil flow along and through the axial bore to radially disposed lubricating ports or cross bores. An annular space is formed between the outer circumference of the nozzle and the inside diameter of the axial bore in the shaft through which oil may flow to lubricate the anti-friction shaft bearing.

Another example of an auxiliary part which directs oil flow through an axial bore in a rotatable bearing-mounted shaft is disclosed in U.S. Pat. No. 1,676,894 to Frank. In this patent a short tube or nipple mounted on an oil supply pocket in the end cap of the bearing housing is slidably disposed in the bore of a bushing fitted in the axial bore of the shaft. Oil flows by gravity and by suction created by centrifugal force from the oil supply pocket through the nipple and into the axial bore of the shaft where it lubricates the shaft and bearing cones via radial cross bores.

U.S. Pat. Nos. 1,704,362 and 4,764,086 disclose other forms of auxiliary parts used to supply oil to bearings via an axial bore in a shaft. U.S. Pat. No. 1,737,465 discloses a water swivel for well drilling in which a tube is threadably mounted to a closing member which is in turn threaded to an exterior sleeve member which supports the lower race of the swivel bearing.

It would be desirable not only to reduce the cost of the prior art constructions of oil feed nozzles, but also to integrate the separate components into a unitary assembly. Moreover, the conventional construction of oil feed nozzles results in a certain amount of fluid flow loss through the nozzle and it would be desirable to at least eliminate such loss and, if possible, to enhance fluid flow through the nozzle.

SUMMARY OF THE INVENTION

The present invention is directed to an anti-friction bearing construction in which an oil feed nozzle is incorporated integrally- with the bearing structure. In one embodiment, the nozzle is integrally formed with the outer race of a closed end bearing and in an alternate embodiment, the nozzle is integrally formed with the cage of an open end bearing. Bearings made according to the present invention are useful in any applications where anti-friction bearings support rotatable shafts with an axial bore for providing a lubrication passage, particularly in centrifugal pump and compressor and automotive manual transmission applications.

The embodiment of the invention in which the nozzle is integrally formed with the outer race may be incorporated in the metal shell material of the closed end bearing by extruding the nozzle from the metal shell material from which the outer race is formed. Alternatively, the nozzle may be formed as a separate plastic or metal part, e.g., by injection molding, cold forming, etc., which part is fastened in a central opening in the shell of the outer race by a snap-in connection or by bonding, welding or other suitable fastening means.

In the embodiment wherein the oil feed nozzle is incorporated in the roller bearing cage of an anti-friction bearing, the cage is preferably formed of a plastic material by molding, but may also be produced from a formed sheet metal material. The molded or formed cage has a circular plate-like element in the center of which a tubular nozzle having a circular cross-section is molded, drawn or extruded. Since the cage of an anti-friction bearing typically rotates at about one-half the RPM of the shaft it supports, the nozzle will rotate at the cage RPM. Vanes are advantageously molded on the interior circumferential surface of the nozzle in such an orientation as to effect pumping of the oil through the nozzle and into the axial bore of the shaft as the cage rotates.

The above-described construction of the oil feed nozzle integrally with the anti-friction outer race or the cage advantageously reduces the overall cost of manufacture and assembly of an oil feed nozzle separate from the bearing assembly. Such construction also avoids the possibility that the nozzle will be omitted or otherwise misassembled during assembly of the anti-friction bearing and shaft. Installation of the nozzle according to the invention also takes place in the more controlled environment of a bearing manufacturing facility rather than in a facility where, for instance, automotive transmissions or hydraulic pumps or compressors are assembled.

With the foregoing and other advantages and features of the invention that will become hereinafter apparent, the nature of the invention will be more clearly understood by reference to the following detailed description of the invention, the appended claims and to the views illustrated in the attached drawings.

DETAILED DESCRIPTION OF THE INVENTION

Figure 1:
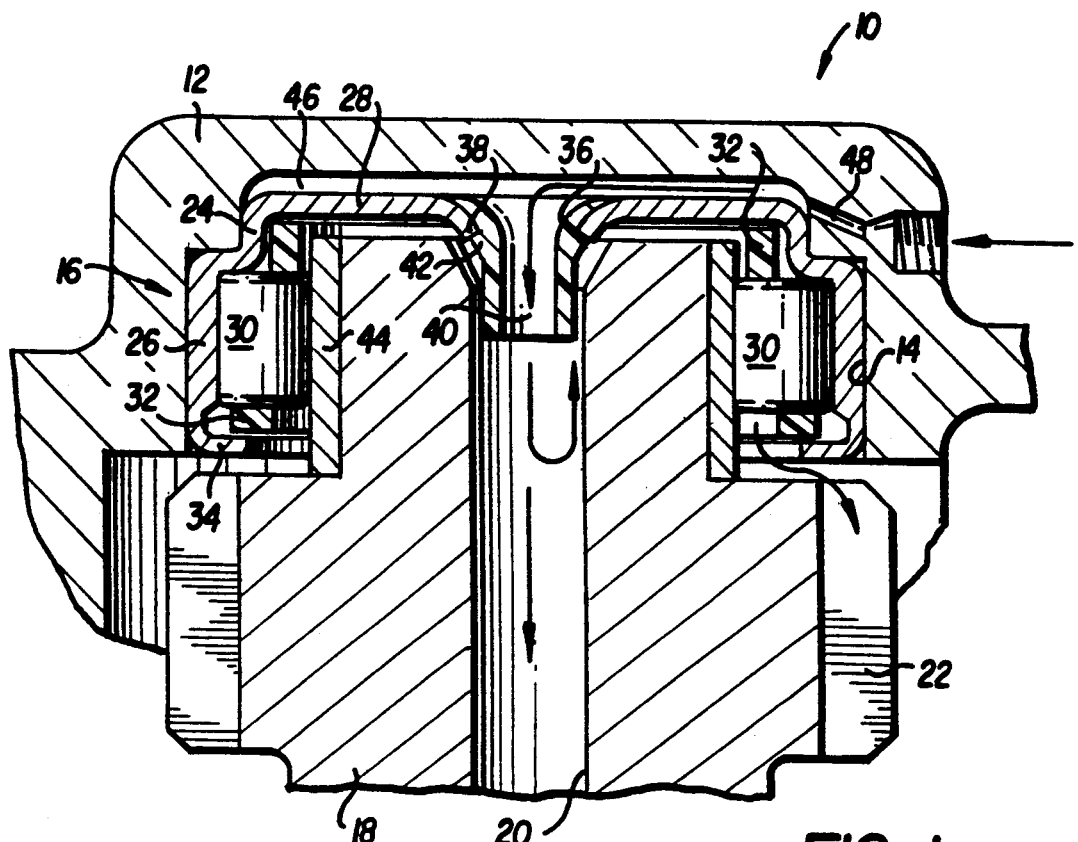
FIG. 1 is a fragmentary cross-sectional view of an anti-friction bearing assembly according to the first embodiment of the invention shown in connection with a conventional automotive manual transmission.

Referring now in detail to the drawings, there is illustrated in FIG. 1 a fragmentary portion of an automotive manual transmission designated generally with reference numeral 10. An automotive manual transmission is shown for illustrative purposes only since the invention may be utilized in any application which involves the flow of a lubricant or other fluid through an axial bore in a rotating shaft supported by anti-friction bearings. FIG. 1 depicts a portion of the transmission housing 12 having a machined bore 14 for receiving an anti-friction roller bearing assembly 16 which rotatably supports a shaft 18. Shaft 18 has an axial bore 20 and may have a toothed gear 22 formed integrally therewith. Gear 22 meshes with another gear (not shown).

The bearing assembly 16 comprises a shell bearing having a formed shell 24 with a cylindrical outer race portion 26 and integral circular plate portion 28. Shell 24 is preferably made of a metal, such as low carbon steel, and carries a plurality of cylindrical roller bearings 30 (e.g., fourteen bearings) which are supported in a cage 32 made from metal or a plastic material, such as polyamide. After the caged roller bearing assembly 30, 32 has been inserted into the shell 24, a lower skirt portion of the shell is bent inwardly to form a flange 34 for retaining the caged bearing assembly 30, 32 in place in a conventional manner.

The circular plate portion 28 of the shell 24 has a central opening 36 formed with a downturned lip 38. A nozzle or circular tube element 40 molded of a plastic material, such as polyamide, is fixed in opening 36 and extends into the axial bore 20 of shaft 18. Nozzle 40 is molded with a shape that conforms to the downturned lip 38 including a yieldable annular lip 42. When the nozzle is inserted into the opening 36 during assembly of the bearing 16, the yieldable annular lip 42 interlocks with the lip 38 to secure the nozzle 40 in place in opening 36.

The nozzle 40 may also be bonded in the opening 36 by adhesive or secured by any other suitable means. It is also within the contemplation and scope of this invention to form the nozzle 40 integrally with the plate 28 by extruding or drawing the metal of the shell 24 into a nozzle shape.

The end of shaft 18 which supports the bearing assembly 16 may be hardened or, as shown, may be provided with a bearing sleeve 44 which forms the inner race of the shell bearing assembly 16. When the bearing assembly 16 and shaft 18 are assembled into the bore 14 of the housing 12 a thin circular reservoir 46 is formed between the housing and the circular plate 28 of the bearing. Oil under a relatively low pressure is supplied to reservoir 46 through a passage 48 which is supplied with oil from a source (not shown).

As shown by the arrows in FIG. 1, oil flows from the source through passage 46 into reservoir 46 from which it flows through nozzle 40 and longitudinally along axial bore 20 to cross bores (not shown) for lubrication purposes. A portion of the oil flows into the annular passage between the outer surface of the nozzle 40 and the circumferential surface of the bore 20, through the caged bearing assembly 30, 32 to lubricate the same and thence past flange 34 to lubricate gear 22 and the gear (not shown) with which it meshes.

It will be understood by those skilled in the art that the nozzle 40 of the embodiment of the invention shown in FIG. 1 is integrally fixed to the circular plate portion 28 and outer race portion 26 of shell 24 and thus does not rotate with the shaft 18, or with the caged bearing assembly 30, 32. In addition, when the bearing assembly 16 is mounted on the shaft 18 the nozzle 40 is inherently accurately positioned coaxially with the bore 20.

Figure 2:
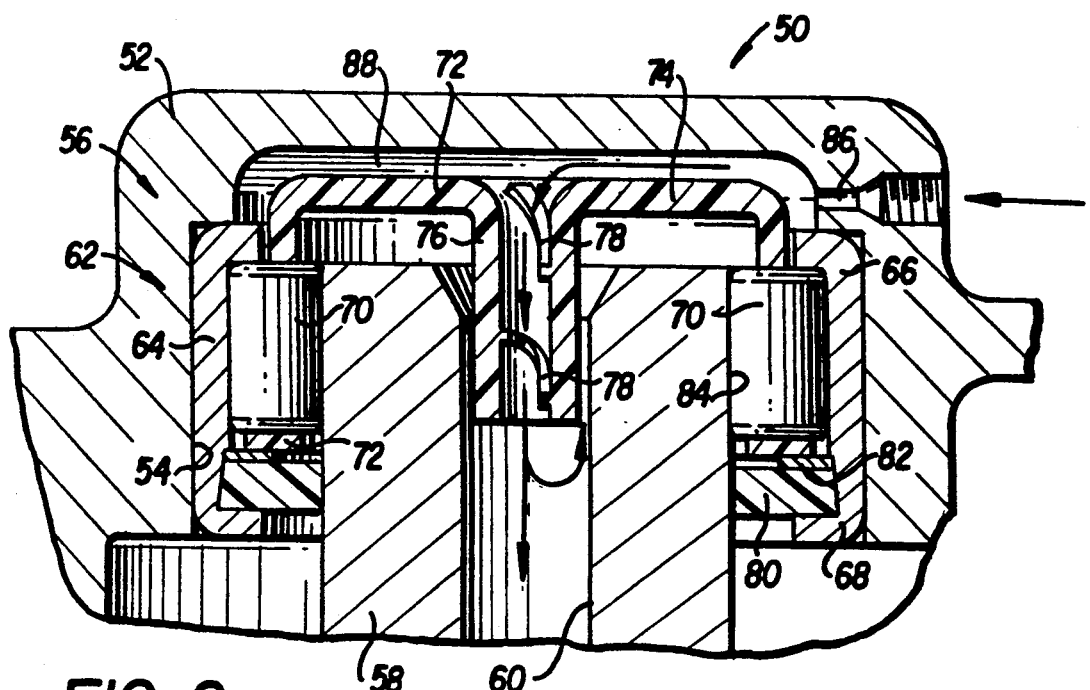
FIG. 2 is a fragmentary cross-sectional view of an anti-friction bearing assembly according to a second embodiment of the invention shown in connection with a conventional automotive manual transmission.

Referring now to FIG. 2, a second embodiment of the invention is shown for illustrative purposes in connection with an automotive manual transmission which is designated generally by reference numeral 50. The transmission comprises a housing 52 in which a bore 54 is machined for receiving an anti-friction roller bearing assembly 56. Bearing assembly 56 supports a shaft 58 having an axial bore 60 extending therethrough.

Bearing assembly 56 comprises an open ended shell bearing having a formed cylindrical shell 62 with an outer race portion 64 and annular inturned flanges 66, 68 at each end thereof to retain caged roller bearings 70 in place. The shell material is preferably a metal material, such as low carbon steel. The roller bearings 70 are retained in a cage 72 which is molded in one piece of a plastic material, such as a polyamide material. The cage 72 may also be formed of metal.

The cage 72 is integrally formed with a circular end cap 74 having a tubular nozzle 76 molded in the center thereof. The inner circumferential surface of the nozzle 76 is provided with one or more helical vanes 78 integrally molded to the nozzle for a purpose to be described hereinafter.

A porous seal 80 retained in place by a retaining ring or washer 82 may be used to prevent contaminants from flowing in the upward direction in FIG. 2 past the seal 80 and into the spaces between the bearings 70 and the outer race portion 64 and between the periphery 84 of shaft 58 which serves as the inner race for the bearing assembly 56.

Oil under low presure is introduced via a passage 86 into a reservoir 88 between the housing 52 and the end cap 74 of the cage 72 from a source (not shown). The oil flows as shown by the arrows in FIG. 2 through the nozzle 76 and through the caged bearing assembly 70, 72 in a manner similar to that described above in connection with FIG. 1.

As the shaft 58 rotates at a given RPM, the caged bearing assembly 70, 72 rotates at about one-half the RPM of the shaft so that the nozzle 76 rotates about its axis at one-half the RPM of the shaft. The helical vanes 78 on the inner wall of the nozzle are arranged to pump the oil in a downwardly direction as viewed in FIG. 2 out the end of the nozzle and through the axial bore 60 of shaft 58. This pumping action also improves oil circulation through the bearing assembly 56 by applying a differential pressure across the porous contaminant excluding seal 80.

As in the FIG. 1 embodiment, it will be seen that the nozzle 76 and end cap 74 are integrally formed with the bearing 56 so that when the bearing 56 is installed with the shaft 58 in the bore 54 of the housing 52, the nozzle 76 is inherently accurately positioned coaxially in the bore 60 of shaft 58.

Although certain presently preferred embodiments of the invention have been described herein, it will be apparent to those skilled in the art to which the invention pertains that variations and modifications of the described embodiment may be made without departing from the spirit and scope of the invention. Accordingly, it is intended that the invention be limited only to the extent required by the appended claims and the applicable rules of law.

What is claimed is:

1. An anti-friction bearing assembly comprising an outer race, a plurality of bearing elements and a cage for said bearing elements, one of said outer race and said cage being integrally formed with a nozzle means for directing oil flow into an axial bore formed in a shaft adapted to be rotatably supported by the bearing assembly.

2. The bearing assembly of claim 1, wherein said nozzle means is integrally formed with said outer race.

3. The bearing assembly of claim 2, wherein said outer race is formed as a shell having an outer race portion and a plate portion with a central opening, said nozzle means extending from said central opening in the plate portion.

4. The bearing assembly of claim 3, wherein said shell and said nozzle means are integrally formed in one piece of a metal material.

5. The bearing assembly of claim 3, wherein said shell is formed in one piece of a metal material and said nozzle means is formed of a plastic material.

6. The bearing assembly of claim 5, including means cooperating between the plate portion and the nozzle means for snap fitting the nozzle means into the central opening of the plate portion.

7. The bearing assembly of claim 1, wherein said bearing assembly supports the shaft into which the flow of oil is directed, said shaft forming part of an automotive manual transmission.

8. The bearing assembly of claim 1, wherein said nozzle means is integrally formed with said cage.

9. The bearing assembly of claim 8, wherein said cage is integrally formed with an end cap, said nozzle means being integrally formed with said end cap.

10. The bearing assembly of claim 9, wherein said nozzle means includes vane means for pumping oil through said nozzle means in response to rotation of the cage.

11. The bearing assembly of claim 10, wherein said cage, including said end cap, nozzle means and vane means, is molded in one piece of a plastic material.

12. The bearing assembly of claim 8, including an outer race formed of metal, said outer race having inturned annular flanges at the ends thereof for retaining the cage and the bearing elements, said cage comprising an end cap extending through one of said flanges, said nozzle means being integrally formed in a central part of the end cap.

13. The bearing assembly of claim 1, wherein said nozzle means comprises a circular tube disposed along the axis of rotation of the bearing assembly.

14. The bearing assembly of claim 13, wherein said circular tube has a length sufficient to extend into the axial bore of the shaft supported by the bearing assembly.

15. The bearing assembly of claim 14, wherein said circular tube has vanes formed on the inner surface thereof.

* * * * *